United States Patent [19]
Morrison

[11] Patent Number: 5,815,671
[45] Date of Patent: Sep. 29, 1998

[54] METHOD AND APPARATUS FOR ENCODING AND STORING AUDIO/VIDEO INFORMATION FOR SUBSEQUENT PREDETERMINED RETRIEVAL

[75] Inventor: Eric Fraser Morrison, Redwood City, Calif.

[73] Assignee: Command Audio Corporation, Sunnyvale, Calif.

[21] Appl. No.: 664,290

[22] Filed: Jun. 11, 1996

[51] Int. Cl.[6] ........................................... H04N 1/41
[52] U.S. Cl. .................. 395/200.77; 348/10; 382/232
[58] Field of Search ..................... 395/200.31, 200.47, 395/200.77; 455/3.1, 4.1, 4.2, 6.1; 348/6, 7, 10; 370/312; 382/232

[56] References Cited

U.S. PATENT DOCUMENTS

| | | | |
|---|---|---|---|
| 3,718,767 | 2/1973 | Ellis | 179/15 |
| 4,247,908 | 1/1981 | Lockhart et al. | 395/325 |
| 4,266,243 | 5/1981 | Shutterly | 358/121 |

(List continued on next page.)

FOREIGN PATENT DOCUMENTS

| | | |
|---|---|---|
| 0 128 093 | 12/1984 | European Pat. Off. . |
| 0 279 451 A2 | 8/1988 | European Pat. Off. . |
| 0 373 386 A2 | 6/1990 | European Pat. Off. . |
| 0 552 051 | 7/1993 | European Pat. Off. . |
| 2651352 A2 | 3/1991 | France . |
| 4024132 A1 | 2/1992 | Germany . |
| WO 87/04309 | 7/1987 | WIPO . |
| WO 89/01429 | 2/1989 | WIPO . |

OTHER PUBLICATIONS

John Saunders, "Real–Time Discrimination of Broadcast Speech/Music," Proceedings of ICASSP, IEEE, 1996, pp. 993–996.

Elecktor Electronics, vol. 14, No. 160, Oct. 1988, Canterbury, GB, pp. 44–47, XP4613, "Macrovision Decoder/Blanker.".

Russ Lockwood, "FM sidebands: tuning in to Wall Street," *Personal Computing,* 27 Apr. 1990, vol. 14, No. 4, p. 80(5).

Daniel Kumin, "RBDS Radios on the Way, But Most Suppliers Cautious," *Twice,* 4 Jan. 1993, p. 9.

Mark Fleischmann, "Now it's digital FM radio. (The Digital Age Comes Home)," *Popular Science,* Nov. 1990, vol. 237, No. 5, pp. 77(3).

Paul Rocheleau, *Radio on Wheels* (book reviews).

*Primary Examiner*—James P. Trammell
*Assistant Examiner*—Patrick Assouad
*Attorney, Agent, or Firm*—Skjerven, Morrill, MacPherson, Franklin & Friel LLP; Norman R. Klivans; Glen B. Choi

[57] ABSTRACT

An entertainment service consists of program material which is encoded, supplied and stored in receivers for later retrieval at the convenience of a subscriber or user. A number of unique options are available and include a format for the presentation of audio/video commercials and other message materials without interfering with the delivery of the program materials within which the message materials are to be inserted. Message materials may be targeted at specific program subscriber groups and specific program categories. The entertainment materials are electronically supplied in a unique format of the program and message materials selectively interspersed with program break flags and message flags. The flags identify and provide preselected access to the materials previously determined by the subscriber's service. The program break flags indicate where message materials are to be inserted in the program material, and the message flags identify the specific message to be inserted as well as provide time related information. The subscriber may select program material at his or her convenience in non-real time from a menu corresponding to the subscribed services.

38 Claims, 5 Drawing Sheets

U.S. PATENT DOCUMENTS

| | | | |
|---|---|---|---|
| 4,323,921 | 4/1982 | Guillou | 380/23 X |
| 4,331,837 | 5/1982 | Sousmagne | 179/1 |
| 4,393,277 | 7/1983 | Besen et al. | 379/88 |
| 4,473,824 | 9/1984 | Claytor | 340/825.27 |
| 4,476,559 | 10/1984 | Brolin et al. | 370/110.1 |
| 4,608,456 | 8/1986 | Paik et al. | 179/1.5 |
| 4,677,552 | 6/1987 | Sibley, Jr. | 364/408 |
| 4,682,368 | 7/1987 | Takahashi | 455/38 |
| 4,683,586 | 7/1987 | Sakamoto et al. | 380/48 |
| 4,752,953 | 6/1988 | Paik et al. | 380/9 |
| 4,788,543 | 11/1988 | Rubin | 340/825.44 |
| 4,809,271 | 2/1989 | Kondo et al. | 370/110.1 |
| 4,852,086 | 7/1989 | Eastmond et al. | 370/69.1 |
| 4,868,866 | 9/1989 | Williams, Jr. | 380/49 |
| 4,916,742 | 4/1990 | Kolenikov et al. | 381/30 |
| 4,942,616 | 7/1990 | Linstroth et al. | 381/51 |
| 5,027,400 | 6/1991 | Baji et al. | 380/20 |
| 5,042,070 | 8/1991 | Linna et al. | 381/59 |
| 5,086,510 | 2/1992 | Guenther et al. | 455/90 |
| 5,121,391 | 6/1992 | Paneth et al. | 370/95.1 |
| 5,131,020 | 7/1992 | Liebesny et al. | 379/59 |
| 5,133,010 | 7/1992 | Borth et al. | 381/38 |
| 5,146,473 | 9/1992 | Critchlow et al. | 375/8 |
| 5,146,612 | 9/1992 | Grosjean et al. | 455/45 |
| 5,152,011 | 9/1992 | Schwob | 455/158.5 |
| 5,177,685 | 1/1993 | Davis et al. | 364/443 |
| 5,182,555 | 1/1993 | Summer | 340/905 |
| 5,206,641 | 4/1993 | Grant et al. | 340/905 |
| 5,210,611 | 5/1993 | Yee et al. | 358/191.1 |
| 5,233,423 | 8/1993 | Jernigan et al. | 358/181 |
| 5,239,700 | 8/1993 | Guenther et al. | 455/158.4 |
| 5,295,154 | 3/1994 | Meier et al. | 375/1 |
| 5,406,626 | 4/1995 | Ryan | 380/9 |
| 5,444,312 | 8/1995 | Noblett et al. | 327/552 |
| 5,452,289 | 9/1995 | Sharma et al. | 370/32.1 |
| 5,467,087 | 11/1995 | Chu | 354/51 |
| 5,524,051 | 6/1996 | Ryan | 380/9 |
| 5,590,195 | 12/1996 | Ryan | 380/9 |
| 5,600,573 | 2/1997 | Hendricks et al. | 364/514 R |
| 5,659,877 | 8/1997 | Enomoto et al. | 455/4.1 |

FIG. 4A  Location of Data in Receiver Program Memory

| program 1 | program 2 | program 3 |
|---|---|---|

Message Insertion Points (PBF): 50 52 54 56 58 60 62 64 X

Messages: | C1 | C2 | C3 | C4 | C5 | C6 | A1 | A2 |

FIG. 4B  Basic Service as Presented

| p1 | C1 | C2 | p1 | C3 | C4 | p1 | C1 | p1 | C5 | C6 | p2 | C1 | p2 | C2 | p2 | C3 | C4 | A2 | p3 | C5 | p3 |

FIG. 4C  Specialized Service as Presented

| p1 | C1 | C2 | A1 | p2 | p2 | p2 | C1 | p2 | C2 | A2 | p3 | C3 | p3 |

FIG. 4D  Commercial Free Service as Presented

| program 1 | A1 | program 2 | A2 | program 3 | A1 |

Time →

METHOD AND APPARATUS FOR ENCODING AND STORING AUDIO/VIDEO INFORMATION FOR SUBSEQUENT PREDETERMINED RETRIEVAL

BACKGROUND OF THE INVENTION

The present invention relates to the delivery of entertainment program materials and supporting message materials to a receiver system for storage and subsequent retrieval by a subscriber/user and, more particularly, to a technique for selectively encoding and presenting audio and video entertainment program materials and supporting message materials in response to a materials selection procedure which is predetermined by a subscriber/user and corroborated by an associated decoding process.

The most common form of receiving entertainment and/or informative audio and video programming is through the medium of AM and FM radio, and VHF and UHF television, broadcasting and receiving respectively, in which the audio and/or video materials received are precisely the materials which are being broadcast at the time of reception. The recipient has no choice but to accept whatever entertainment or informative program materials are selected for transmission, and further is committed to receiving any program supporting message materials such as commercials, announcements and other related messages which the broadcaster or originator chooses to include with the program materials.

Continuous program materials such as broadcast by radio or television generally contain repetitious information as part of the program materials. Almost certainly, common material is included in and with a variety of programs throughout the listening period. Obvious examples of repetitious program material is the broadcasting of the same newscasts, while examples of repetitious supporting message materials are the broadcasting of the same commercials, special messages and station call signs.

In a more specialized form of broadcasting, if a program originator is to offer optional services such as commercial free programs to one subscriber or user using a storage system for subsequent presentation, and another service containing commercials or other special messages to another subscriber/user, it becomes necessary to broadcast unique program services to each subscriber/user. When the service is required to provide a variety of supporting material for the program to a wide audience of thousands of subscribers/users, then re-transmission of each unique style of program becomes inefficient and impractical. For the above reasons, the variety of services offered in such special broadcasting systems is restricted and unavailable to the average person.

A more recent medium for receiving entertainment and informative materials, primarily in an alphanumeric format is, for example, the FM radio sideband broadcasting to dedicated portable devices or computers which are adapted with special FM receivers and software. The materials transmitted may be for example news and financial information. Typically, the materials are transmitted in digital format, received, and stored in a memory for subsequent access by the user using menu driven software. The materials generally are utilized by being displayed on a self contained visual screen or computer monitor in conventional alphanumeric format. Software provided with the program materials by the originator allows the user to scan the incoming materials and to transfer, to internal memory and/or display on the visual screen or monitor, the incoming materials which meet the desired parameters set by the subscriber/user.

The dedicated systems have the disadvantages of being limited to displaying a small amount of text information on a small screen. The computer based systems have the disadvantages of requiring a personal computer as a receiving means and of providing the program materials primarily on only a computer monitor screen. Further, the usual computer skills are required in order to operate such systems which, in addition, also tend to be relatively expensive.

SUMMARY OF THE INVENTION

The present invention circumvents the problems and shortcomings of the above-mentioned AM/FM radio broadcasting/receiving system, the VHF/UHF television broadcasting/receiving system and/or the system of alphanumeric format broadcasting to dedicated portable devices or computers via the FM sideband, while providing a unique entertainment system consisting of program and auxiliary message materials to be transmitted over an assigned frequency band and stored for later retrieval and use.

Typical radio and television program materials consist of a main entertainment program and numerous commercials and special messages in or around the program. In a unique entertainment system such as the present invention in which program and message materials are transmitted to a user's receiver for storage, it is desirable to offer a variety of subscriber program services. Such a unique entertainment system is described for example in U.S. Pat. No. 5,406,626 issued Apr. 11, 1995, and U.S. Pat. No. 5,524,051 issued Jun. 4, 1996, U.S. Pat No. 5,590,195 issued Dec. 31, 1996 to John O. Ryan and copending U.S. application Ser. No. 08/627,947, filed Apr. 3, 1996, the contents of which are incorporated by reference herein. Although the various subscriber services may be different, they may contain the same program materials, commercials and other message materials. Alternatively, some services may contain different program materials, may contain the same program materials with different commercials or other message materials, or may not contain any commercials at all. The program materials typically include news, sports, weather, financial information, cultural information, political and social commentary, etc., and message materials typically include advertisements or commercial listings, program and service promotionals, public service announcements, station call signs, etc.

It is to be understood that although the invention techniques and apparatus are described herein in terms of audio entertainment program and message materials, the techniques are equally applicable to video entertainment programs and message materials and apparatus configured for the receiving, storing and subsequent playback of such video materials.

A number of unique options are available and selectable by a recipient, i.e., subscriber or user, depending upon the user's needs or desires. The options include, for example, the receipt of selectable audio or video program materials wherein the format includes the presentation of commercials and other message materials, with updating and selection of the commercials and/or other message materials without interfering with the transmission of the program materials. The invention system further presents the message materials at specific time segments within the day with or without regard to the program is material selected at that time by the user. Upon subsequent retrieval, the message materials likewise are inserted at appropriate times within, before or after the program material without interfering with the transmission of the program or programs, and the message materials are retrieved and inserted within the program materials without the loss of any program material. In addition, the message materials may be targeted at specific program subscriber groups as well as at specific program categories.

In accordance with the invention, entertainment services generally are electronically transmitted in a unique format consisting of the program materials, commercials, announcements and other message materials, with program break flags and message flags selectively interspersed within the format to identify and provide preselected access to the materials subscribed to by the subscriber. The program break flags indicate where message materials are to be inserted in the program materials, while the message flags identify the particular message which is to be inserted as well as provide time related information.

The program materials are transmitted in the form of digital information data, to a multitude of receiving devices hereinafter termed "receivers", each of which contain a memory to store in real time the program materials subscribed to for subsequent retrieval by the user in non-real time. The receiver therefore will contain in storage in their entirety without interruption those programs of the transmitted programs which the respective receiver is authorized to receive. That is, the program materials which are received by a receiver are preselected by the subscriber, and the receiver is provided with a corresponding code number which allows it to receive and store the preselected program materials. Message materials including announcements and commercials, requiring insertion in the entertainment program materials, are delivered to the receivers separately and also are stored in respective locations in the receiver memory, for subsequent retrieval. User service code data corresponding to the selected format of services also is stored in the receiver memory. Upon retrieval, the user may select a program or programs at his or her convenience from a menu provided with each receiver, wherein each menu of each receiver is tailored to the specific format of program and message materials, that is, to the menu of services, preselected by the subscriber/user. A break in the program material for insertion of message material such as a commercial, is preceded by a program break flag of, for example, four bytes, inserted as auxiliary information transmitted and stored along with the program materials. In addition to using a program break flag to indicate an appropriate break in the program material for message material insertion, a message code flag contains message code data related to and identifying the message material to be inserted. The receiver compares this message code data with the previously mentioned program break flag stored in the receiver, and if authorized, finds the required message material also stored in the receiver. The message material is inserted by interrupting the regular program material and replacing it with the inserted message material. At the conclusion of the inserted message material, the respective regular program material is resumed.

By way of example only, the program break flag described herein comprises three of an available four bytes of code and accompanies the program materials to indicate the break point where message material is to be inserted. The message code flag herein comprises four bytes of code preceding the respective message material and identifies the material as well as the number of times and time of day that the information is inserted.

In operation, the encoded audio or video program materials, message materials, and respective program break and message code flags are transmitted in encoded form to the multitude of receivers, where all the received information is stored in real time in respective storage locations. Upon subsequent retrieval of a program by a user, program break flags included at prescribed times in the program indicate the breaks in the respective program material in which a preselected message material is to be inserted, and also determine in conjunction with the user service code if message material is to be inserted. In addition, the message code flag is compared to the program break flag to determine if the required message material is to be retrieved, and the retrieved material is inserted into the program material at the required time and location. Upon conclusion of the message material, the retrieval and presentation of the program material is resumed.

DESCRIPTION OF THE PREFERRED EMBODIMENTS

Figure 1:
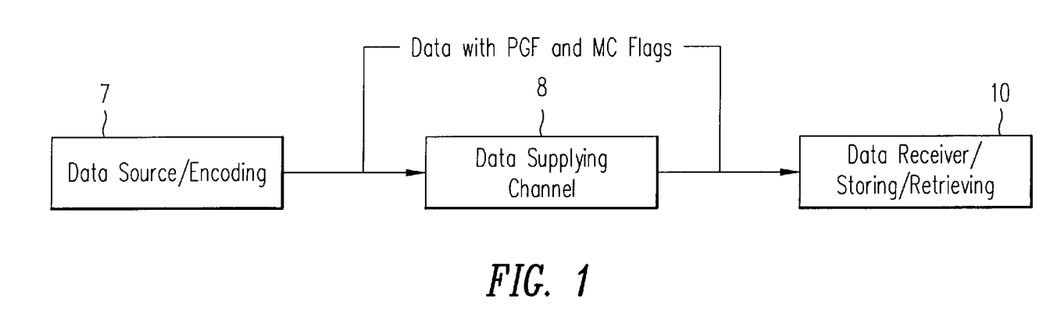
FIG. 1 is a block diagram of apparatus in which the invention may be employed.

FIG. 1 illustrates apparatus for providing the environment in which the invention may be employed, and includes a data source/encoding means 7, a data supplying means 8 and a data receiver/storing/retrieving means 10. The data source/encoding means 7 includes the source of the program and message materials provided by an originator such as, for example, a broadcast facility, and includes apparatus for encoding respective program flags and message code flags of the present invention into the program and message materials. The data supplying means 8 comprises the means for supplying the encoded information from the means 7 to the data receiver of means 10 and includes some form of channel transmission/distribution system and may comprise, for example, an audio or video signal transmitter or a cable or telephone signal delivery system. Thus, the encoded information from the data source/encoding means 7 may be supplied to the data receiver/storing/retrieving means 10 via any of several available services having analog or digital signal delivering channels. The data receiver/storing/retrieving means 10 comprises a radio or television receiver selectively modified to receive and store in real time the encoded information supplied by the data supplying means 8, and to subsequently retrieve, in non-real time at a user's convenience, the portions of the program and message materials to which the user had previously subscribed.

Examples of the means 7, 8 and 10 may be found in the patents and applications of John O. Ryan and Eric Fraser Morrison specified above. The specific codes and technique of encoding and decoding the program and message materials for retrieval thereof in accordance with the invention is further described hereinafter.

Figure 2:
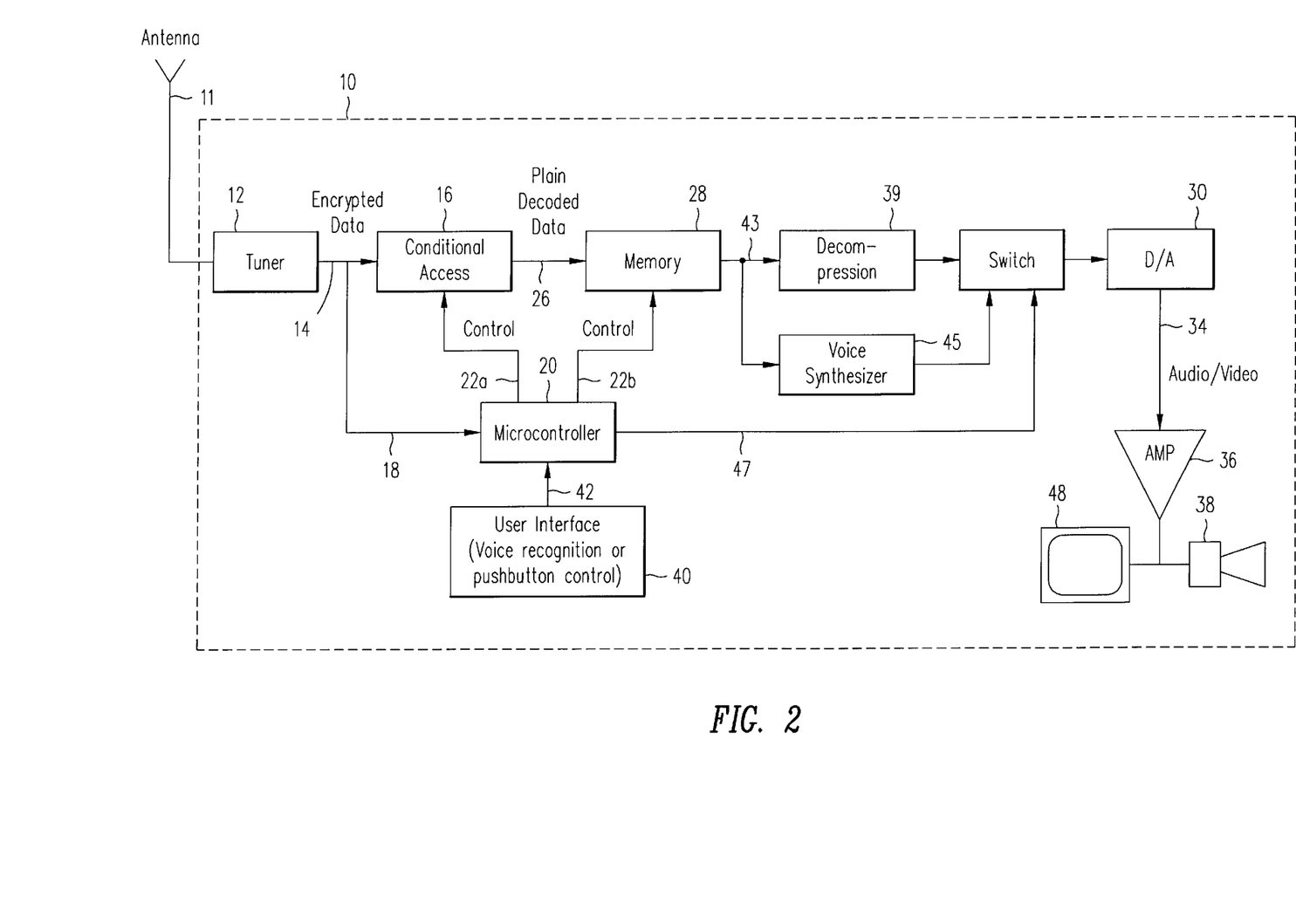
FIG. 2 is a block diagram illustrating circuitry of the receiver for effecting the intended operation of the invention.

FIG. 2 illustrates a receiving apparatus, namely the data receiver/storing/retrieving means 10, hereinafter termed receiver 10, which exemplifies one embodiment of an environment for employing the invention techniques. A broadcast signal is received, for example, via an antenna 11, which provides a received radio broadcast signal or television broadcast signal to a tuner 12. Each audio or video data item is "tagged" with a unique identification to allow retrieval of the stored encoded audio or video data from memory. Tuner 12 may be any of various tuners of the type well known in the art. The tuner 12 provides an extracted digitized data signal (which is typically encoded) to a conditional access circuit 16 on a lead 14 and thence to a microcontroller (controller) 20 on a lead 18.

The conditional access circuit 16 ensures that the encoded data on line 14 is decoded only if the proper key or command has been provided, as described below. Conditional access circuit 16 decodes the received data as authorized by the microcontroller 20 over a lead 22a and provides the decoded data on a lead 26 for storage in a receiver memory 28, which may be conventional integrated circuit random access memory (RAM). Memory 28 may be volatile or non-volatile integrated circuit and may include a non-volatile storage medium such as a digital audio tape, a magneto-optical minidisk, a magnetic disk or an optical disk, with sufficient capacity to store sufficient information for several hours of audio or video data.

In order to provide the needed quantity of audio or video data in a minimum time frame, to minimize bandwidth requirements and to minimize the memory requirement, the original data in an exemplary embodiment is subject to a data compression algorithm at the transmitter to compress the data sufficiently. The receiving apparatus 10 includes a companion decompression algorithm in a decompression circuit 39, herein connected to the output of memory 28 by a lead 43. The decoded compressed data output of the memory 28 is accessed under control of the microcontroller 20 via control signals including read signals on a lead 22b, to determine which particular items of data stored in memory 28 are to be supplied to the decompression circuit 39 via the memory output lead 43.

Some of the data that a user uses in such a system may be in alphanumeric form that can be easily transmitted in that form and converted to audio at the receiver via speech synthesis. In order to accommodate the dual transmission of alphanumeric data as well as audio or video data, a switch 46 controlled by the microcontroller 20 via a lead 47 determines whether the currently accessed data is in the form of originally alphanumeric data or compressed audio or video data. When originally alphanumeric data is being accessed, the alphanumeric data is provided via the line 43 to a speech (voice) synthesizer 45 whose digital audio output is connected to the switch 46. The selected data is supplied to a digital-to-analog converter 30 for conversion of the digitized data to analog data signals, that then are applied to a conventional audio or video amplifier 36 and loudspeaker or earphone 38.

When the invention is used for the presentation of television signals, the output of the memory 28 containing digitized video data is applied to video decompression circuit 39 (if the signals were compressed prior to transmission) a video D/A 30, a video amplifier 36 and a receiver/monitor 48.

A user interface 40 inputs commands on a line 42 to microcontroller 20 to determine which data from memory 28 are to be accessed. The information is categorized, stored, and accessed as a conventional hierarchial database stored in memory 28 under control of microcontroller 20. User interface 40 drives a hierarchy of menus to allow a user to access the information by indicating the desired selections from the menus.

For full effectiveness, the receiver 10 may be at least partly powered on 24 hours a day. Tuner 12, microcontroller 20, conditional access circuit 16 and memory 28 are the elements that typically remain powered on at all times (by battery power if necessary) to receive a continuous update of the broadcast information, and thereby to store current data in memory 28.

In accordance with the invention, there are other variables dictating the message to be inserted from the volume of message materials which previously may have been sent and stored. The message materials to be inserted may be the next-in-line of a pre-determined order, messages of particular types that suit the current program messages that suit the service desired by the subscriber/user, messages based on the time-of-day the user is listening to or watching the program, or messages based on the precise time. The number of times the message is to be repeated in the many breaks that may occur throughout a listening period is also considered.

Message materials for the day are transmitted as a group at a number of convenient times throughout a 24 hour day. The repeated transmission ensures all receivers have the opportunity of receiving and storing the messages. The four byte identifying code, corresponding to the message code flag preceding the message material, is shown as a "message code flag" (MC) in FIG. 3(A) and an explanation of the symbols used are described in Table I. To identify the time that a break in the program is to occur, an equivalent "program break flag" (PBF) is included. The program break flag contains sufficient information to also find the precise message required for the break or to select the next message of a sequence of message materials or any of a combination of messages within predetermined categories suitable for the break. The program break flag uses three of the four available bytes and is described in FIG. 3(B) and Table I. In this example, the unused bits within a byte are spare.

How the receiver responds to the program break flag is determined by a number of variables defined by information stored in the receiver and information contained in the four byte code.

TABLE I

| Code Word | Message Code Flag | Program Break Flag | Comments |
|---|---|---|---|
| MESID Message ID | — | 3 bits | Stop program and commence message routine in receiver |
| MESTP Message Time Period | 3 bits | — | All; commute, morning afternoon, evening, other prime time, night |
| MESCT Message Category | 3 bits | 3 bits | Paid comm, local area comm, prog promos, service promos, public service |
| SUBSC Subs. Service Categories | 4 bits | 4 bits | All; news and sports, news only, commentary, finance, etc. |
| PGMCT Program Categories | 4 bits | 4 bits | All distinct types of programs |
| MESFER Message Frequency | 3 bits | — | Number of times per listening period |

TABLE I-continued

| Code Word | Message Code Flag | Program Break Flag | Comments |
|---|---|---|---|
| MESTS Message Time Stamp | 4 bits | — | Time of day when message is made available or disabled |
| MESNO Message Number | 8 bits | 8 bits | Specific commercial number within program and service category |

NOTE:
The program break flag indicates where a message is to be inserted in a program. The message code flag precedes each unique message in the message transmission sequence.

Figures 3A, 3B:
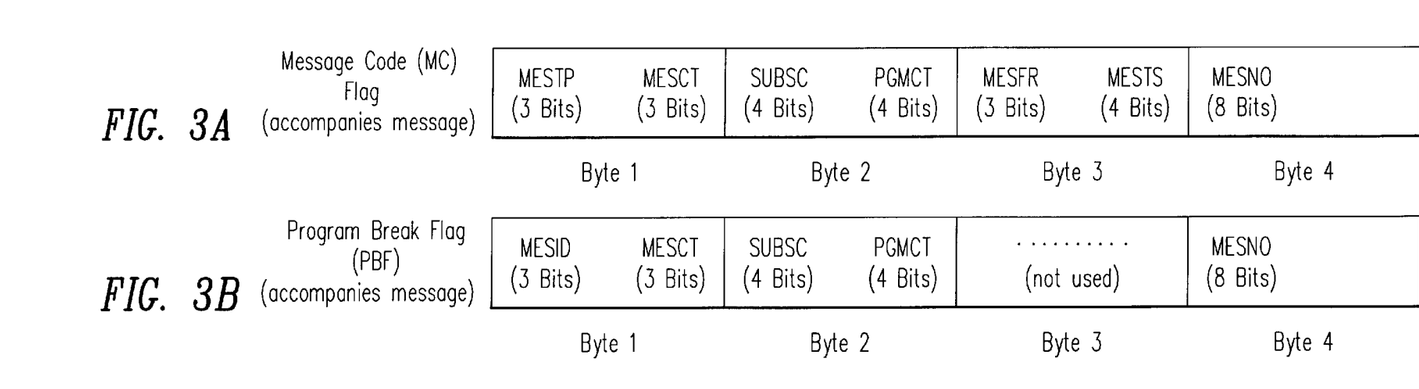
FIGS. 3(A), 3(B) are timing diagrams illustrating a message code flag and a program break flag for accompanying message material and program materials, respectively.

Referring to FIGS. 3(A), 3(B) and, when a program break flag (PBF) occurs in a program, the 4 bytes of the flag temporarily are stored in the receiver processor. A PBF code word labeled Message ID (MESID, 3 bits) informs the receiver to enter one of the program break routines. Information concerning the service the receiver is to provide, as pre-determined by the subscriber/user to suit the desired entertainment needs and made available through the subscription and the programming of the receiver, is extracted from the user service code data (USC) stored in the receiver memory 28. The time of day and the date supplied via a receiver clock also is extracted using a message code word labeled message time period MESTP (3 bits). The Message ID is compared with the user service code data to determine if the user is to receive message materials. Program code words labeled Message Category (MESCT, 3 bits) and Subscriber Service Categories (SUBSC, 4 bits) from the PBF also are checked against the message category and service categories subscribed to and reflected in the user's service code data. If there is a match, the routine continues and stops a program address counting process in the microcontroller 20, thereby halting presentation of the current program. If there is no match, the current program continues without interruption to the next inserted PBF. A code word labeled Program Categories (PGMCT, 4 bits) from the PBF also is compared with the program categories of the previously stored messages to determine if messages in those categories exist. Then a code word labeled Message Number (MESNO, 8 bits) from the PBF seeks the message from the memory 28. If the message number in the PBF is zero or the message corresponding to the requested number does not exist, the next message in that message material category is selected.

If the message selected contains any time related codes such as code words in the message flag corresponding to the Time Period, Frequency and Start/Stop, they are compared with the receiver clock. The code word labeled Time Period (MESTP, 3 bits) indicates the time of day the message is to be used. Times are broken up into listening (or viewing in the case of a television delivery system) periods such as, commute, other prime time, morning, afternoon, evening and night. A code word labeled Message Frequency (MESFR, 3 bits) indicates the number of times the message is to be played within a listening time period. A code word labeled (Start/Stop) Time Stamp NSTS, 4 bits) indicates the time within a time period a message is available for presentation or is no longer available for presentation. Such a feature is used for pre-recorded press releases or the times when a particular event is to end, such as a department store sale.

Either the precise message or the next available message is selected for insertion in the program material. The message is found in the memory and playback commences at the start of the message as indicated by a pre-programmed message address counting process in the microcontroller 20 commencing at count zero. The end of the message is indicated by a flag in the message which when identified, causes the program address counting to be restored, whereupon the current program material is restored. The message address counting process is reset to zero in preparation for the next message. The message then is incremented and placed behind other message materials in that category awaiting their turn for presentation.

Figure 4A:
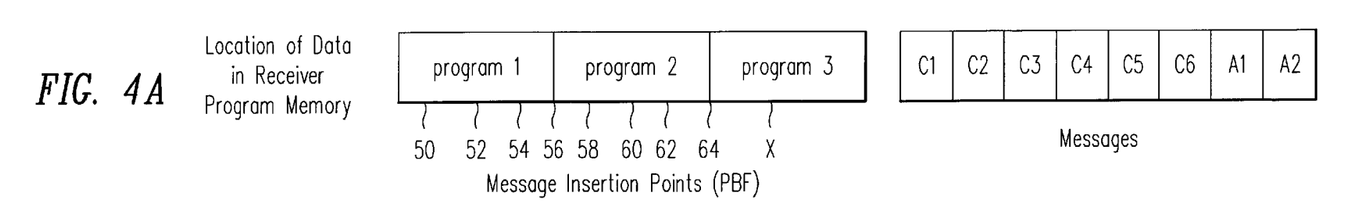
FIGS. 4(A), 4(B), 4(C), 4(D) are timing diagrams illustrating the location of the program materials, message materials and respective flags which are stored in and retrieved from a respective receiver memory for three typical subscriber services.
Figure 4B:
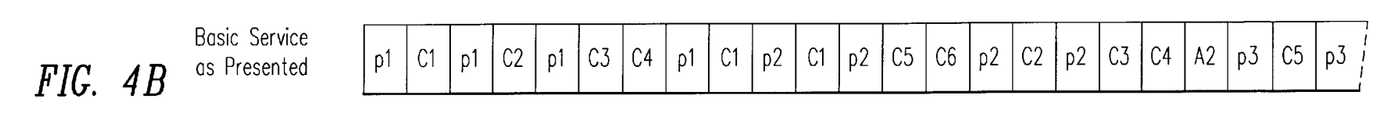
Figure 4C:
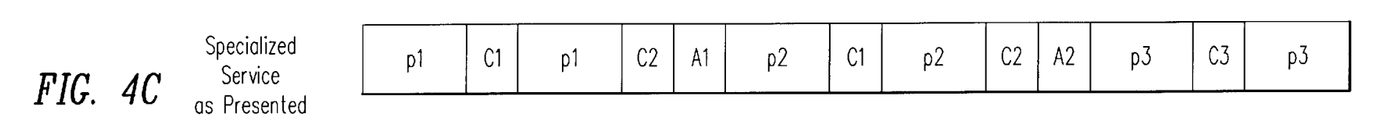

FIGS. 4(A), 4(B), 4(C), 4(D) depict simplified timing diagrams illustrating stored and reproduced material of a typical receiver for three typical services available to a subscriber/user. In FIG. 4(A), three programs, designated hereafter as p1, p2 and p3, are stored in identifiable memory locations. A series of eight messages designated C1–C6 for commercials and A1, A2 for announcements are stored together in another receiver memory location. The "x" tabs indicate locations in time in the programs where program break flags (PBF) are inserted. As depicted in FIG. 4(B), a basic service defined by the user service code data (USC) is one presenting messages at every break. In FIG. 4(C), a more specialized service again defined by the service code data, presents only certain messages, and in FIG. 4(D) a very specialized service defined by the service code data presents only special announcements with no commercial messages. A fourth service defined by the service code data may be, for example, one in which no message material is presented at all. It is noted that FIG. 4 does not show the effect of time dated messages.

Referring in greater detail to FIGS. 4(A), 4(B), 4(C), 4(D), the basic service subscribed to is of less expense and provides a message taken from the stored message material at every break initiated by a respective program break flag (PBF). To this end, program P1 is shown in FIG. 4(B) as being retrieved for a period of time until the occurrence of PBF 50 (that is, numeral 50 on FIG. 4(A)), corresponding to the break at which message C1 (a commercial) is checked against the user service code data, is retrieved and inserted in place of program p1. At the conclusion of C1, the presentation of the current program p1 is resumed until a next PBF occurrence 52, at which time message C2 (another commercial) is checked, retrieved and inserted in place of p1. At the conclusion of C2, the presentation of the same program p1 is resumed, and continues to the next PBF occurrence 54, at which break commercials C3 and C4 are inserted consecutively. At the conclusion of C4, the same program p1 resumes. At the conclusion of program p1 at time 56 corresponding to a natural program break the commercial C1 is inserted and repeated. At the conclusion of C1 a new program p2 is retrieved from memory, after having been checked against the service code data, and is presented to the user. The process of inserting predetermined message material into predetermined program material continues through programs p2 and p3, wherein commercial C1 is inserted at PBF occurrence 58, commercials C5, C6 are inserted at PBF occurrence 60, commercial C2 is inserted at PBF occurrence 62, commercials C3, C4 and announcement A2 are inserted at the conclusion of p2 at a time 64 corresponding to the end of the program p2. A new program p3 then is checked and retrieved for presentation to the subscriber, and so the process continues.

Figure 4D:
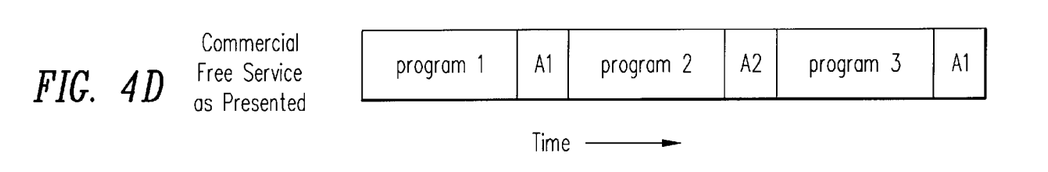

As may be seen, the service depicted in FIG. 4(C) has fewer program material interruptions and correspondingly less message material insertions. Thus, for example, PBF occurrence 52 may be the only break responded to during program p1 for insertion of commercial C1. Commercial C2 and announcement A1 are inserted at the conclusion of p1 at time 56, and so forth. The service of FIG. 4(D) is even less interrupted and correspondingly more exclusive.

Figure 5:
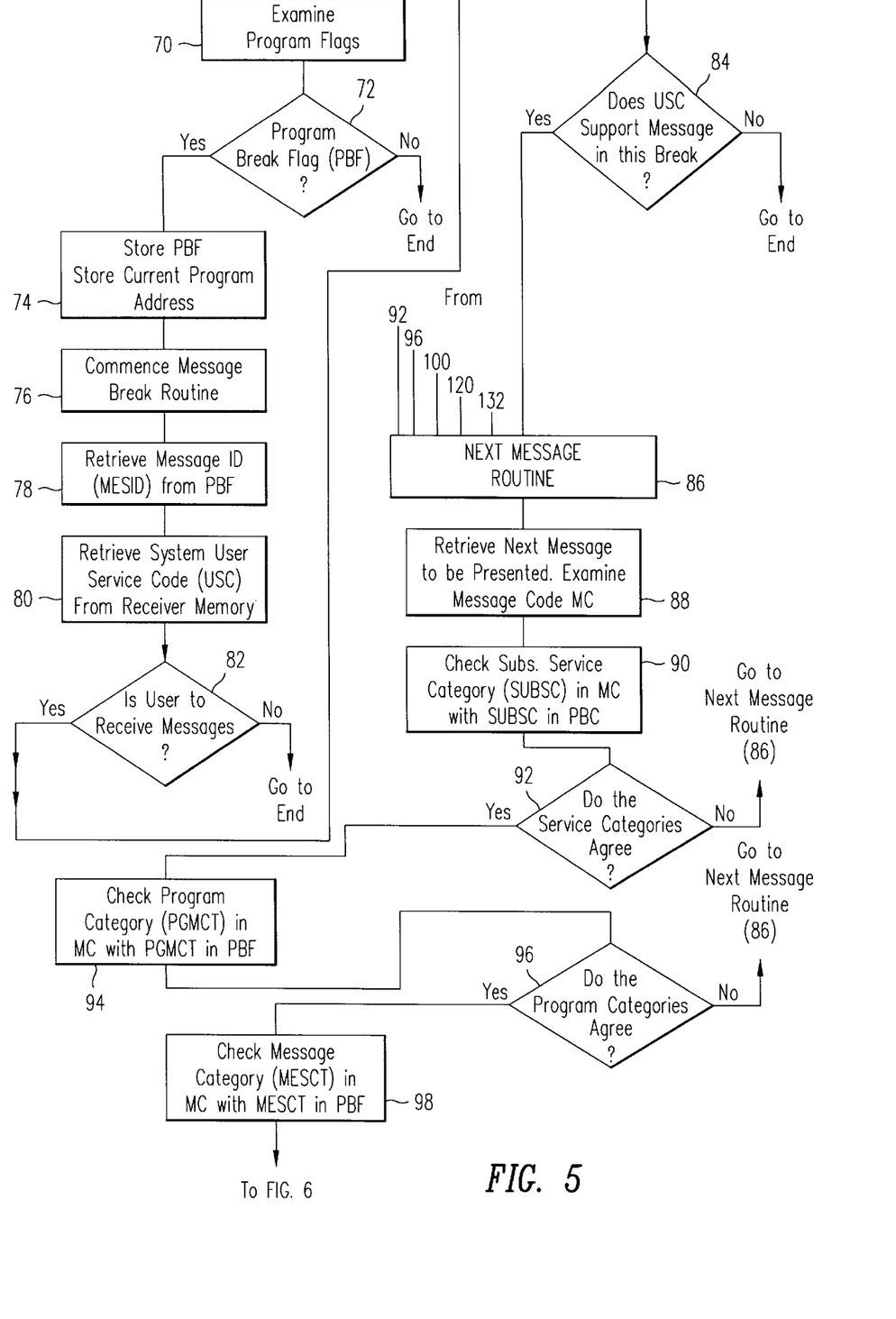
FIGS. 5 and 6 are a flow chart illustrating the sequence of events which are followed for retrieving entertainment program material and for inserting message material in the program material.
Figure 6:
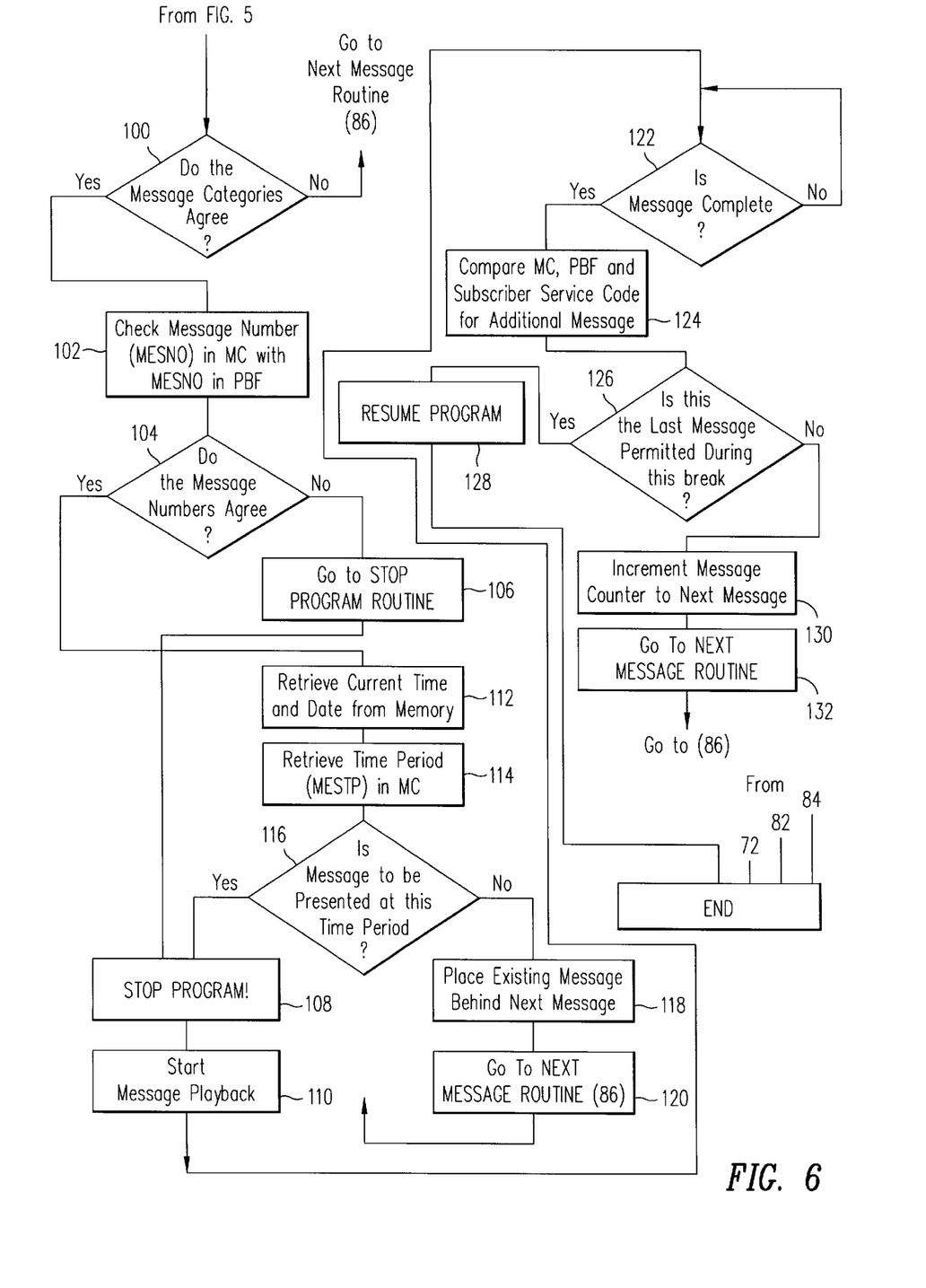

Referring now to FIGS. 5 and 6, the program break routine flow chart illustrates the sequence of events corresponding to the process of retrieving selected stored program and message materials in response to the particular services subscribed to and, more particularly, to the program break flags and message code flags retrieved along with the materials. The sequence proceeds with the insertion of the preselected messages into respective breaks in the preselected program materials, and with the resumption of the respective program material upon the completion of each of the inserted messages. Although a number of routines are envisaged, the purpose of the invention is more specifically illustrated in a program break routine shown in the flow chart of FIGS. 5 and 6. The routine of FIGS. 5 and 6 generally is self-explanatory and thus only briefly is discussed below.

Referring to FIGS. 5 and 6, the receiver 10 of FIG. 2 constantly monitors the program break flags of FIG. 3(B) in the auxiliary data accompanying a program during the reproduction of that program, as depicted by the block 70 in the flow chart. When a break in the program is available, a program break flag (PBF) accompanying a program file identifies the place in the program the break is to be inserted. The routine then asks, in block 72, if a PBF is identified in the current program? If so, the flag is stored, in block 74, in the receiver memory 28 to allow a subsequent examination of the code words which contain details of the type of messages that are suitable for this break (see Table 1). The routine also stores the current program address. After the message(s) is(are) completed the program will resume from this program address. The sequence then begins the message break routine in block 76. The message ID is retrieved and defines the break routine to be adopted in block 78. Only one message is depicted here in this example.

In block 80 the user service code data (USC) stored in the memory 28 of receiver 10 describes the user service. If the service is not commercial-free, the categories of commercials and messages to be presented are defined. These messages, together with their unique address, are pre-stored in the receiver memory. If the user has a commercial-free service, commercials will not be stored in the receiver memory when received. There are other types of messages other than commercials that are stored which are of interest to the user and require insertion at specific times either during a program or at either end of a program. The PBF determines the time in a program when the program is interrupted to present such messages.

As depicted in block 82, if the user has a totally message-free service this routine is terminated. If the program address counting process is not interrupted, the program will continue without a break and the user is unaware the break routine even commenced. If the user service code includes message materials, then the routine continues to block 84 of FIG. 5.

Referring to FIG. 5, the user may subscribe to a service that only permits selected messages. Thus in block 84, the routine asks if the user service code dictates that a message should be inserted in this break. If not, the program continues uninterrupted. If the decision is made to insert a message, the routine continues to block 86 for the next message routine. Like the program break, each message carries its own unique message code (MC) which is examined in block 88. As previously discussed, the code, shown in Table 1 and FIG. 3(A), contains information describing the type of message and how and when it should be presented. When the information in the fields of the message's MC and the program's PBF are compared in the receiver's microcontroller 20 and found to correlate as in block 90, then the message is selected from memory 28 for presentation as shown in the following steps of the routine. To this end, in block 92 the routine determines if the type of message selected is suitable for presentation in the subscriber's service. Next, in block 94, the routine compares the program category (PGMCT) of the PBF with that of the message code. If the service categories do not agree in block 96, the program continues without a break. If the type of message selected is suitable for presentation in the program category, the routine continues to block 98 where the specific program and message is checked.

In FIG. 6, the routine determines in block 100 if the type of message selected is suitable for presentation in the specific program. If so, in block 102 a message number in both the program break code and the message code indicate the message must be presented during this break regardless of the time of day. If the message numbers agree in the block 104, the entertainment program is directed in block 106 and stopped in block 108. The routine continues to block 110, and the message commences from the beginning. If the numbers do not agree, a time and date check are made in blocks 112, 114 using the receiver's internal clock.

If there is no restriction on the time the message is to be presented, or the time the message is to be presented agrees with the current time as in block 116, then the entertainment program is stopped as depicted in blocks 108, 110. If the message is not to be presented at this time, the message selected is placed behind the next message in line, block 118, ready for examination by the routine at the start of the next break. After the messages are reordered the message routine commences again in blocks 120, 86 with the next message in line.

As depicted in block 110 when the existing message is to be presented the entertainment program is stopped and the message commences. When the message is completed in block 122, FIG. 6, the routine continues to the block 124 where the message code, program data code and the subscriber service code are compared to determine if further messages are to be presented. The break may permit additional messages depending on information in the message codes and the type of subscriber service, as determined in block 126. In block 128, if the message just completed is the last message for the break, the program resumes using the stored current program address mentioned in block 74. If another message is permitted, the message number counter is incremented in block 130 and the next message routine commences via blocks 132, 86.

Although the invention has been described herein relative to specific embodiments, various additional features and advantages will be apparent from the description and drawings, and thus the scope of the invention is defined by the following claims and their equivalents.

What is claimed is:

1. Apparatus for presenting preselected program materials and message materials for transmission and retrieval by a user, comprising:

means for encoding the program materials and the message materials with signals identifying the respective materials and identifying when message material is to be inserted relative to program material;

a receiver for receiving and storing the encoded materials in real time; and the receiver including means for subsequently retrieving the stored preselected program and message materials while determining which stored preselected message materials to insert relative to the program materials in response to a respective signal.

2. Apparatus for presenting preselected program materials and message materials for transmission and retrieval by a user including:

means for encoding the program materials and the message materials with signals identifying the respective materials and identifying when message material is to be inserted relative to program material;

a receiver for receiving and storing the encoded materials in real time;

the receiver including means for subsequently retrieving the stored preselected program and message materials while determining which stored preselected message materials to insert relative to the program materials in response to a respective signal; and means for supplying the encoded program materials, the message materials and the signals to the receiver at preselected time periods for storage in real time.

3. The apparatus of claim 2 including:

means integral with the retrieving means for storing in real time and retrieving in non-real time user service code data indicative of message materials preselected by the user.

4. The apparatus of claim 3 wherein the means for storing includes:

a processor for comparing the program material signals with the service code data to determine if message material is to be inserted.

5. The apparatus of claim 4 wherein the signals include:

a program break flag accompanying the program material and indicative of a location relative to the program material for insertion of the selected message material; and a message code flag preceding the message material and indicative of the message and of time related parameters thereof for identifying the message material which is to be inserted relative to the program material.

6. The apparatus of claim 5 wherein:

the user service code data includes m selected programs and n selected messages; and the receiver includes:

a memory for storing in real time the m selected programs in a first memory location and the n selected messages in a second memory location; and a microprocessor providing a menu responsive to the user for selecting the m selected programs at a time subsequent to storing.

7. The apparatus of claim 5 wherein the preselected program and message materials are audio or video entertainment materials, or alphanumeric text, and the receiver is one of an AM/FM radio or VHF/UHF television receiver.

8. The apparatus of claim 5 wherein:

the program break flag comprises a multiple byte identifying code which identifies the occurrence of breaks in and about program materials, and whether selected message material is inserted in the respective break; and the message code flag comprises a multiple byte identifying code which identifies the message and the time of day and date the message is to be inserted.

9. The apparatus of claim 8 wherein:

the program break multiple byte identifying code includes identification bytes for message identification and message number, and message, subscriber service and program categories; and the message multiple byte identifying code include identification bytes for message time period and frequency, message time stamp and message number and message, subscriber service and program categories.

10. A method of transmitting preselected program materials and preselected message materials to a user, comprising the steps of: encoding the preselected program and message materials with identification signals;

transmitting in real time the preselected program and message materials together with the identification signals;

storing the received materials and signals retrieving the preselected program materials subsequently;

determining preselected message materials, and inserting the preselected message materials relative to the program materials if authorized in response to the identification signals.

11. A method of transmitting preselected program materials and preselected message materials to a user, comprising the steps of:

encoding the preselected program and message materials with identification signals;

transmitting in real time the preselected program and message materials together with the identification signals;

storing the received materials and signals;

retrieving the preselected program materials subsequently;

determining preselected message materials;

inserting the preselected message materials relative to the program materials if authorized in response to the identification signals wherein the step of encoding includes:

encoding the program materials with program break flag signals determinative of the occurrence of breaks in and about program materials, and of a preselected message material for the respective break; and encoding the message materials with message code flag signals determinative of the following message material and the time of day and date the message material is to be inserted.

12. The method of claim 11 wherein a program break flag signal comprises a code word which identifies a break in the program material for message material insertion, and a message code flag signal comprises a code word which identifies the message material to be inserted.

13. A method of transmitting preselected program materials and preselected message materials to a user, comprising the steps of:

encoding the preselected program and message materials with identification signals;

transmitting in real time the preselected program and message materials together with the identification signals;

storing the received materials and signals;

retrieving the preselected program materials subsequently;

determining preselected message materials;

inserting the preselected message materials relative to the program materials if authorized in response to the identification signals wherein:

the step of storing includes storing a user service code which identifies the message materials preselected by the user; and the step of retrieving includes retrieving the user service code to determine if a message material is to be inserted.

14. A method of transmitting preselected program materials and preselected message materials to a user, comprising the steps of:

encoding the preselected program and message materials with identification signals;

transmitting in real time the preselected program and message materials together with the identification signals;

storing the received materials and signals;

retrieving the preselected program materials subsequently;

determining preselected message materials;

inserting the preselected message materials relative to the program materials if authorized in response to the identification signals wherein the step of retrieving further includes:

comparing the stored message material identification signal with the stored program material identification signal; and retrieving the stored message material if the message material and program material identification signals match.

15. A method of transmitting preselected program materials and preselected message materials to a user comprising the steps of:

encoding the preselected program and message materials with identification signals;

transmitting in real time the preselected program and message materials together with the identification signals storing the received materials and signals;

retrieving the preselected program materials subsequently;

determining preselected message materials;

inserting the preselected message materials relative to the program materials if authorized in response to the identification signals;

wherein the program and message materials may be audio or video programs or alphanumeric text.

16. A method of transmitting preselected program materials and message materials to a user, comprising the steps of:

identifying the preselected program materials and message materials with respective identification signals;

transmitting the preselected program and message materials together with their respective identification signals for storage in real time;

retrieving in non-real time the stored preselected program materials;

determining message materials interspersed relative to program materials in response to the identification signals; and retrieving in non-real time message materials if authorized interspersed relative to the program materials.

17. The method of claim 16 wherein the step of identifying includes:

encoding the program materials with program break codes which indicate the insertion of message materials relative to the program materials; and encoding the message materials with message codes which identify the message materials to be inserted.

18. A method of transmitting preselected program materials and message materials to a user, comprising the steps of:

identifying the preselected program materials and message materials with respective identification signals;

transmitting the preselected program and message materials together with their respective identification signals for storage in real time;

retrieving in non-real time the stored preselected program materials;

determining message materials interspersed relative to program materials in response to the identification signals;

retrieving in non-real time message materials if authorized interspersed relative to the program materials; and providing a user service code that controls presentation of the message materials.

19. The method of claim 18 wherein the step of retrieving includes:

comparing the program break codes with the user service code to determine if the user is to retrieve message materials; and comparing the message codes with the program break codes to determine the message materials to be inserted relative to the program materials.

20. A method of transmitting preselected program materials and message materials to a user, comprising the steps of:

identifying the preselected program materials and message materials with respective identification signals;

transmitting the preselected program and message materials together with their respective identification signals for storage in real time, retrieving in non-real time the stored preselected program materials;

determining message materials interspersed relative to program materials in response to the identification signals;

retrieving in non-real time message materials if authorized interspersed relative to the program materials;

encoding the program materials with program break codes which indicate the insertion of message materials relative to the program materials;

encoding the message materials with message codes which identify the message materials to be inserted wherein the step of retrieving message materials includes;

determining in response to the program break codes a point in or about the program materials where a message material is to be inserted; and determining in response to the program break codes and message codes the number of message materials as well as the time of day and date each message material is to be inserted.

21. A method of transmitting preselected program materials and message materials to a user, comprising the steps of:

identifying the preselected program materials and message materials with respective identification signals;

transmitting the preselected program and message materials together with their respective identification signals for storage in real time;

retrieving in non-real time the stored preselected program materials;

determining message materials interspersed relative to program materials in response to the identification signals;

retrieving in non-real time message materials if authorized interspersed relative to the program materials;

encoding the program materials with program break codes which indicate the insertion of message materials relative to the program materials;

encoding the message materials with message codes which identify the message materials to be inserted wherein:

a program break code comprises multiple bytes identifying the occurrence of breaks in and about the program materials; and a message code comprises multiple bytes identifying the message and the time of day, the date and the frequency that the message is to be inserted.

22. The method of claim 21 wherein:

the program break code multiple bytes identify the message and program categories and the subscriber service category; and the message code multiple bytes identify the message and subscriber service categories as well as time related information.

23. A receiver for presenting preselected program materials and message materials to a user, wherein:

the program materials and the message materials are encoded with signals identifying the respective materials and identifying when message material is to be inserted relative to program material;

the receiver receives and stores the encoded materials in real time, the receiving including circuitry coupled to receive the stored preselected program and message materials and identifying signals that subsequently retrieves the stored preselected program and message materials and determines the insertion of selected message material relative to the program material in response to a respective identifying signal.

24. A receiver for presenting preselected program materials and message materials, wherein:

the program materials and the message materials are encoded with signals identifying the respective materials and identifying when message material is to be inserted relative to program material;

the receiver receives and stores the encoded materials in real time, the receiving including circuitry coupled to receive the stored preselected program and message materials and identifying signals that subsequently retrieves the stored preselected program and message materials and determines the insertion of selected message material relative to the program material in response to a respective identifying signal;

the receiver further stores and retrieves user service code data indicative of message materials preselected by the user.

25. The receiver of claim 24, further including:

a processor for comparing the program material signals with the service code data to determine if message material is to be inserted.

26. The receiver of claim 25 wherein the signals include:

a program break flag accompanying the program material and indicative of a location relative to the program material for insertion of the selected message material; and a message code flag preceding the message material and indicative of the message and of time related parameters thereof for identifying the message material which is to be inserted relative to the program material.

27. The receiver of claim 26 wherein:

the user service code data includes m selected programs and n selected messages; and the receiver further includes:

a memory coupled to receive the m selected programs and n selected messages for storing in real time the m selected programs in a first memory location and the n selected messages in a second memory location; and a microprocessor providing a menu responsive to the user for selecting the m selected stored programs in response to the identifying signals.

28. The receiver of claim 26 wherein the preselected program and message materials include audio or video entertainment materials or alphanumeric text, and the receiver includes a radio or television receiver.

29. The receiver of claim 26 wherein:

the program break flag comprises a multiple byte identifying code which identifies the occurrence of breaks in and about program materials, and whether selected message material is inserted in the respective break; and the message code flag comprises a multiple byte identifying code which identifies the message and the time of day and date the message is to be inserted.

30. The receiver of claim 29 wherein:

the program break multiple byte identifying code includes identification bytes for message identification and message number, and message, subscriber service and program categories; and the message multiple byte identifying code includes identification bytes for message time period and frequency, message time stamp and message number and message, subscriber service and program categories.

31. A receiver for presenting preselected program materials and message materials comprising:

access circuitry for receiving the program materials and the message materials encoded with signals identifying the respective materials and identifying when message material is to be inserted relative to program material;

a memory circuitry coupled to the access circuitry for storing the received materials; and the memory that retrieves from the memory the stored preselected program and message materials and determines selected message materials to insert relative to program materials in response to identifying signals.

32. The receiver of claim 31, further including memory that stores and retrieves user service code data indicative of message materials preselected by a user.

33. The receiver of claim 32, further including:

a processor that compares the program material signals with the service code data to determine if message material is to be inserted.

34. The receiver of claim 33 wherein the signals include:

a program break flag accompanying the program material and indicative of a location relative to the program material for insertion of the selected message material; and a message code flag preceding the message material and indicative of the message and of time related parameters thereof that identifies the message material which is to be inserted relative to the program material.

35. The receiver of claim 34 wherein:

the user service code data further includes m selected programs and n selected messages;

the memory stores in real time the m selected programs in a first memory location and the n selected messages in a second memory location; and a microprocessor that provides a menu responsive to the user and selects the m selected programs subsequent to storing in response to the identifying signals.

36. The receiver of claim 34 wherein the preselected program and message materials include audio or video entertainment materials or alphanumeric text, and the receiver includes a radio or television receiver.

37. The receiver of claim 34 wherein:

the program break flag comprises a multiple byte identifying code which identifies the occurrence of breaks in and about program materials, and identifies whether selected message material is inserted in the respective break; and the message code flag comprises a multiple byte identifying code which identifies the message and the time of day and date the message is to be inserted.

38. The receiver of claim 37 wherein:

the program break multiple byte identifying code includes identification bytes for message identification and message number, and message, subscriber service and program categories; and the message multiple byte identifying code includes identification bytes for message time period and frequency, message time stamp and message number and message, subscriber service and program categories.

* * * * *

UNITED STATES PATENT AND TRADEMARK OFFICE
CERTIFICATE OF CORRECTION

PATENT NO. : 5,815,671
DATED : September 29, 1998
INVENTOR(S) : Eric Fraser Morrison It is certified that error appears in the above-identified patent and that said Letters Patent is hereby corrected as shown below:

Column 15,
Line 38, change "receiving" to -- receiver --.
Line 52, change "receiving" to -- receiver --.

Column 16,
Line 51, cancel "the memory".
Line 52, change "the memory" to -- memory --.

Signed and Sealed this

Thirteenth Day of August, 2002

Attest:

JAMES E. ROGAN
Attesting Officer
Director of the United States Patent and Trademark Office